US012725782B2

(12) United States Patent
Kim et al.

(10) Patent No.: US 12,725,782 B2
(45) Date of Patent: Sep. 1, 2026

(54) METHOD OF MANUFACTURING NEGATIVE ELECTRODE

(71) Applicant: LG ENERGY SOLUTION, LTD., Seoul (KR)

(72) Inventors: Young Jae Kim, Daejeon (KR); Jung Woo Yoo, Daejeon (KR); Chan Soo Jun, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 810 days.

(21) Appl. No.: 17/796,760

(22) PCT Filed: Mar. 24, 2021

(86) PCT No.: PCT/KR2021/003656

§ 371 (c)(1),
(2) Date: Aug. 1, 2022

(87) PCT Pub. No.: WO2021/194260

PCT Pub. Date: Sep. 30, 2021

(65) Prior Publication Data

US 2023/0082023 A1 Mar. 16, 2023

(30) Foreign Application Priority Data

Mar. 27, 2020 (KR) ........................ 10-2020-0037696

(51) Int. Cl.

*H01M 4/04* (2006.01)
*H01M 4/02* (2006.01)
*H01M 4/134* (2010.01)
*H01M 4/1395* (2010.01)
*H01M 4/38* (2006.01)
*H01M 4/48* (2010.01)

(52) U.S. Cl.

CPC ....... *H01M 4/0459* (2013.01); *H01M 4/0404* (2013.01); *H01M 4/0435* (2013.01); *H01M 4/044* (2013.01); *H01M 4/134* (2013.01); *H01M 4/1395* (2013.01); *H01M 4/386* (2013.01); *H01M 4/483* (2013.01); *H01M 2004/021* (2013.01); *H01M 2004/027* (2013.01)

(58) Field of Classification Search

None
See application file for complete search history.

(56) References Cited

U.S. PATENT DOCUMENTS

2005/0130043 A1 6/2005 Gao et al.
2012/0321965 A1 12/2012 Fujikawa et al.
2013/0003261 A1 1/2013 Remizov et al.
2013/0327648 A1 12/2013 Grant et al.
2015/0017543 A1 1/2015 Lee et al.
2015/0367747 A1* 12/2015 Decker ................ H02J 7/0069 320/136
2016/0141596 A1 5/2016 Uhm et al.
2019/0237750 A1 8/2019 Kim et al.
2019/0393480 A1* 12/2019 Brevnov ............ H01M 4/1393
2020/0058929 A1 2/2020 Chae et al.
2020/0067085 A1 2/2020 Chae et al.
2020/0321612 A1 10/2020 Chae et al.
2021/0135274 A1 5/2021 Chae et al.
2021/0257602 A1* 8/2021 Chae .................... H01M 4/583

FOREIGN PATENT DOCUMENTS

CN 104584278 A 4/2015
CN 105190958 A 12/2015
CN 110178252 A 8/2019
EP 3 561 918 A1 10/2019
JP 2016110777 A * 6/2016
JP 2017-76466 A 4/2017
JP 6448336 B2 1/2019
KR 10-2006-0056969 A 5/2006
KR 10-2012-0127494 A 11/2012
KR 10-2013-0007320 A 1/2013
KR 10-2014-0106645 A 9/2014
KR 10-2014-0111622 A 9/2014
KR 10-2015-0014877 A 2/2015
KR 10-2017-0074030 A 6/2017
KR 10-2019-0017149 A 2/2019
KR 10-2019-0083305 A 7/2019
WO WO 2018/186561 A 10/2018
WO WO 2019/164319 A1 8/2019

OTHER PUBLICATIONS

JP2016110777A Machine Translation (Year: 2016).*
International Search Report (PCT/ISA/210) issued in PCT/KR2021/003656, dated Jul. 1, 2021.
Extended European Search Report for European Application No. 21775423.3, dated Sep. 13, 2024.

* cited by examiner

*Primary Examiner* — Stewart A Fraser
*Assistant Examiner* — Patrick Marshall Greene
(74) *Attorney, Agent, or Firm* — Birch, Stewart, Kolasch & Birch, LLP

(57) ABSTRACT

A method of manufacturing a negative electrode, which includes: applying a negative electrode slurry on a negative electrode current collector and subjecting the applied negative electrode slurry to a first roll-pressing to form a negative electrode active material layer; pre-lithiating the negative electrode active material layer to form a pre-lithiated negative electrode active material layer; and subjecting the pre-lithiated negative electrode active material layer to a second roll-pressing, wherein the negative electrode active material layer includes a silicon-based active material, and a ratio ($p_1/p_2$) of porosity ($p_1$) of negative electrode active material layer after the first roll-pressing to porosity ($p_2$) of negative electrode active material layer after the second roll-pressing is in a range of 1.05 to 1.65.

10 Claims, No Drawings

METHOD OF MANUFACTURING NEGATIVE ELECTRODE

CROSS-REFERENCE TO RELATED APPLICATION

This application claims priority to and the benefit of Korean Patent Application No. 10-2020-0037696, filed on Mar. 27, 2020, the disclosure of which is incorporated herein by reference in its entirety.

TECHNICAL FIELD

The present invention relates to a method of manufacturing a negative electrode.

BACKGROUND ART

With the recent rapid spread of electronic devices using a battery, such as mobile phones, notebook computers, and electric vehicles, and the like, the demand for small, lightweight, and relatively high-capacity secondary batteries is rapidly increasing. In particular, lithium secondary batteries have attracted attention as a driving power source for portable devices due to their light weight and high energy density. Accordingly, there have been active research and development efforts to improve the performance of lithium secondary batteries.

The lithium secondary batteries generally include a positive electrode, a negative electrode, a separator interposed between the positive electrode and the negative electrode, an electrolyte, an organic solvent, and the like. In addition, in the positive electrode and the negative electrode, an active material layer including a positive electrode active material or a negative electrode active material may be formed on a current collector. In general, a lithium-containing metal oxide such as $LiCoO_2$, $LiMn_2O_4$, or the like is used as a positive electrode active material in the positive electrode, and accordingly, a carbon-based active material or a silicon-based active material, which does not contain lithium, is used as a negative electrode active material in the negative electrode.

In the case of such a negative electrode, a passivation film such as a solid electrolyte interface layer (SEI layer) is formed on a surface of the negative electrode during initial charging, and the passivation film improves the aging of the negative electrode structure and the reversibility of the negative electrode by preventing the penetration of an organic solvent into the negative electrode and suppressing a decomposition reaction of the organic solvent, and thus enables use as a negative electrode. However, since the formation of the passivation film is an irreversible reaction, the consumption of lithium ions is caused, resulting in a decrease in the capacity of a battery, and as battery cycles are repeated, lithium ions are consumed, and capacity and cycle lifetime are reduced.

Therefore, negative electrode pre-lithiation methods (i.e., intercalation of lithium into the above-described negative electrode) for forming a passivation film on a surface of the negative electrode in advance and thus preventing a decrease in capacity and improve cycle lifetime have been developed.

For example, pre-lithiation methods such as bringing lithium metal into contact with a negative electrode structure to diffuse lithium into the negative electrode structure or placing a negative electrode structure in a lithium saltcontaining solution and electrochemically charging the negative electrode structure while using lithium metal as a counter electrode are known.

Meanwhile, among the negative electrode active materials, silicon-based negative electrode active materials have attracted attention because the capacity thereof is about 10 times higher than that of carbon-based negative electrode active materials, and the silicon-based negative electrode active materials have an advantage in that even a thin electrode is capable of implementing high energy density due to the high capacity. However, the silicon-based negative electrode active materials may undergo volume expansion due to charging and discharging, which may result in a degradation of lifetime characteristics, and thus have not been widely used.

The volume expansion of the silicon-based active materials due to charging may also be problematic in pre-lithiation, and since an electrical short circuit may occur between active materials due to the volume expansion caused by the intercalation of lithium into the silicon-based active materials, the desired pre-lithiation may not be easily achieved, and lifetime performance may be degraded.

Korean Patent Publication No. 10-2017-0074030 relates to a negative active material for a lithium secondary battery, a method of manufacturing the same, and a lithium secondary battery including the same, and discloses a negative active material including a porous silicon-carbon composite, but there is a limitation in solving the above-described problems.

RELATED-ART DOCUMENT

Patent Document

Korean Patent Publication No. 10-2017-0074030

DETAILED DESCRIPTION OF THE INVENTION

Technical Problem

The present invention is directed to providing a method of manufacturing a negative electrode including a silicon-based active material, which is capable of preventing an electrical short circuit between active materials and improving lifetime characteristics and energy density.

Technical Solution

One aspect of the present invention provides a method of manufacturing a negative electrode, which includes: applying a negative electrode slurry on a negative electrode current collector and subjecting the applied negative electrode slurry to a first roll-pressing to form a negative electrode active material layer; pre-lithiating the negative electrode active material layer; and subjecting the pre-lithiated negative electrode active material layer to a second roll-pressing, wherein the negative electrode active material layer comprises a silicon-based active material, and wherein a ratio ($p_1/p_2$) of porosity ($p_1$) of negative electrode active material layer after the first roll-pressing to porosity ($p_2$) of negative electrode active material layer after the second roll-pressing is in the range of 1.05 to 1.65.

Advantageous Effects

A method of manufacturing a negative electrode including a silicon-based active material of the present invention is characterized in that the first roll-pressing is performed before pre-lithiation, the second roll-pressing is performed after pre-lithiation, and the ratio of the porosity of the negative electrode active material layer after the first roll-pressing and the second roll-pressing is adjusted within a specific range. According to the present invention, since a negative electrode active material layer is roll-pressed to a point of attaining relatively high porosity during first roll-pressing, the risk of occurrence of an electrical short circuit due to the volume expansion of active materials after pre-lithiation can be prevented, and damage to active materials can be prevented. In addition, since a negative electrode active material layer is roll-pressed to a point of attaining desired porosity during the second roll-pressing performed after pre-lithiation, a negative electrode having high energy density and improved lifetime characteristics can be manufactured.

MODES OF THE INVENTION

Terms and words used in this specification and the claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technical spirit of the present invention.

The terms used in the present specification have been used only for the purpose of describing exemplary embodiments and are not intended to limit the present invention. Singular expressions include plural expressions unless the context clearly indicates otherwise.

It will be understood that terms such as "comprising", "including", or "having" when used in the present specification, specify the presence of stated features, numbers, steps, components, or combinations thereof and do not preclude the possibility of the presence or addition of one or more other features, numbers, steps, components, or combinations thereof.

In the present specification, an average particle diameter ($D_{50}$) may be defined as a particle diameter corresponding to the 50% cumulative volume in a particle diameter distribution curve. The average particle diameter ($D_{50}$) may be measured using, for example, a laser diffraction method. The laser diffraction method generally allows for the measurement of a particle diameter ranging from a submicron level to several millimeters and can produce a result having high reproducibility and high resolution.

Hereinafter, the present invention will be described in detail.

<Method of Manufacturing Negative Electrode>

The present invention relates to a method of manufacturing a negative electrode, and more particularly, to a method of manufacturing a negative electrode for a lithium secondary battery.

A method of manufacturing a negative electrode of the present invention includes: applying a negative electrode slurry on a negative electrode current collector and subjecting the applied negative electrode slurry to a first roll-pressing to form a negative electrode active material layer; pre-lithiating the negative electrode active material layer to form a pre-lithiated negative electrode active material layer; and subjecting the pre-lithiated negative electrode active material layer to a second roll-pressing, wherein the negative electrode active material layer includes a silicon-based active material, and wherein a ratio ($p_1/p_2$) of porosity ($p_1$) of negative electrode active material layer after the first roll-pressing to porosity ($p_2$) of negative electrode active material layer after the second roll-pressing is in the range of 1.05 to 1.65.

Conventionally, a method of pre-lithiating or manufacturing a negative electrode including a silicon-based active material includes pre-lithiating a negative electrode structure, which has been roll-pressed to a point of attaining desired porosity (e.g., about 30% to 35%), by a method such as electrochemical charging or the like. However, when a negative electrode structure whose porosity has been adjusted to be low is pre-lithiated, since the volume of a silicon-based active material expands to a relatively large extent, an electrical short circuit occurs between active materials and the active materials are damaged, and therefore, the lifetime of a negative electrode is shortened and the desired pre-lithiation cannot be achieved. Once a negative electrode whose porosity has been adjusted to be low is pre-lithiated, even when the negative electrode is roll-pressed to a point of attaining desired porosity or pressure is applied to the negative electrode structure, the aftermath of the electrical short circuit occurring between active materials and the damage to the active materials may continue to affect a produced negative electrode or secondary battery.

In order to solve this problem, the method of manufacturing a negative electrode of the present invention is characterized in that in manufacturing a negative electrode including a silicon-based active material, the first roll-pressing is performed before pre-lithiation, the second roll-pressing is performed after pre-lithiation, and the ratio of the porosity of the negative electrode active material layer after the first roll-pressing and the second roll-pressing is adjusted within a specific range. According to the present invention, since a negative electrode active material layer is roll-pressed to a point of attaining relatively high porosity during first roll-pressing, the risk of occurrence of an electrical short circuit due to the volume expansion of active materials after pre-lithiation can be prevented, and damage to active materials can be prevented. In addition, since a negative electrode active material layer is roll-pressed to a point of attaining desired porosity during the second roll-pressing performed after pre-lithiation, a negative electrode having high energy density and improved lifetime characteristics can be manufactured.

<First Roll-Pressing>

The method of manufacturing a negative electrode of the present invention includes applying a negative electrode slurry on a negative electrode current collector and subjecting the applied negative electrode slurry to a first roll-pressing and thus forming a negative electrode active material layer.

The negative electrode current collector is not particularly limited as long as it does not cause a chemical change in a battery and has high conductivity. Specifically, the negative electrode current collector may include one or more selected from the group consisting of copper, stainless steel, aluminum, nickel, titanium, calcined carbon, and an aluminum-cadmium alloy and preferably includes copper.

The negative electrode current collector may typically have a thickness of 3 to 500 μm.

The negative electrode current collector may have fine irregularities formed in a surface thereof to increase the adhesion of a negative electrode active material. For example, the negative electrode current collector may be used in any of various forms such as a film, a sheet, a foil, a net, a porous material, a foam, a non-woven fabric, and the like.

A negative electrode slurry is applied on the negative electrode current collector. By applying the negative electrode slurry on the negative electrode current collector and carrying out first roll-pressing, or by applying the negative electrode slurry on the negative electrode current collector and carrying out first roll-pressing and drying, a negative active material layer may be formed.

The negative electrode slurry may be applied on one or both sides of the negative electrode current collector. When the negative electrode slurry is applied on both sides of the negative electrode current collector, a negative electrode active material layer may be formed on both sides of the negative electrode current collector.

The negative electrode slurry includes a silicon-based active material.

The silicon-based active material may include a compound represented as $SiO_x$ ($0 \leq x < 2$). Since $SiO_2$ does not react with lithium ions and thus cannot store lithium, it is preferable that x satisfies the above range.

Specifically, the silicon-based active material may include Si. Although Si is usually advantageous in terms of having about 2.5 to 3 times higher capacity than silicon oxides (e.g., $SiO_x$ ($0<x<2$)), Si undergoes more severe volume expansion/contraction than silicon oxides and thus is relatively difficult to commercialize. However, in the case of the present invention, as the first roll-pressing and second roll-pressing processes to be described below and the ratio of porosity of negative electrode active material layer after the first roll-pressing to porosity of negative electrode active material layer after the second roll-pressing are controlled, the problem of degradation of lifetime characteristics caused by the volume expansion of an active material can be effectively resolved, and the advantages of silicon-based active materials, such as high capacity, energy density, and rate characteristics, can be more preferably realized. More specifically, the silicon-based active material may be formed mostly of Si or may be formed of Si.

The average particle diameter ($D_{50}$) of the silicon-based active material may be in the range of 1 μm to 10 μm and preferably 2 μm to 6 μm in terms of ensuring the structural stability of the active material during charging and discharging, enabling a conductive network for maintaining electrical conductivity to be more smoothly formed, or further increasing the accessibility of a binder used for binding an active material and a current collector.

The silicon-based active material may be included in the negative electrode slurry in an amount of 50% to 85% by weight and preferably 65% to 80% by weight based on the solid content of the negative electrode slurry in terms of minimizing the effect of volume expansion/contraction of the silicon-based active material and sufficiently realizing the high capacity of a silicon-based active material in a secondary battery.

The negative electrode slurry may include a negative electrode conductive material and/or a negative electrode binder in addition to the silicon-based active material.

The negative electrode binder may be used to improve adhesion between a silicon-based active material and a negative electrode current collector, or to improve binding between silicon-based active materials.

Specifically, the negative electrode binder may include one or more selected from the group consisting of styrene-butadiene rubber (SBR), acrylonitrile-butadiene rubber, acrylic rubber, butyl rubber, fluororubber, polyvinyl alcohol (PVA), carboxymethyl cellulose (CMC), starch, hydroxypropyl cellulose, regenerated cellulose, polyvinyl alcohol (PVA), polyacrylic acid (PAA), polyethylene glycol (PEG), polyacrylonitrile (PAN), and polyacryl amide (PAM) in terms of further improving electrode adhesion and imparting sufficient resistance against the volume expansion/contraction of a silicon-based active material.

The negative electrode binder preferably includes one or more selected from the group consisting of PVA, PAA, PAN, and PAM and more preferably includes PVA and PAA in terms of having high strength, excellent resistance against the volume expansion/contraction of a silicon-based active material, and the ability to prevent the distortion and warpage of an electrode by imparting excellent flexibility to the negative electrode.

Specifically, the negative electrode binder may include PVA and PAA, and more specifically, the negative electrode binder may be a copolymer of PVA and PAA. When the negative electrode binder is a copolymer of PVA and PAA, the copolymer of PVA and PAA may include units derived from vinyl alcohol and units derived from acrylic acid in a weight ratio of 50:50 to 90:10 and preferably 55:45 to 80:20.

The negative electrode binder may be included in the negative electrode slurry in an amount of 5% to 30% by weight and preferably 10% to 25% by weight based on the solid content of the negative electrode slurry, and when this range is satisfied, since a silicon-based active material can be more effectively bound, the problem of active material volume expansion can be minimized, and at the same time, the negative electrode binder can be more easily dispersed when preparing a slurry used for forming a negative electrode active material layer, and the coating properties and the phase stability of a slurry can be improved.

The negative electrode conductive material may be used to assist and improve conductivity in a secondary battery, and is not particularly limited as long as it does not cause a chemical change and has conductivity. Specifically, the negative electrode conductive material may include one or more selected from the group consisting of: graphite such as natural graphite or artificial graphite; carbon black such as acetylene black, Ketjen black, channel black, furnace black, lamp black, or thermal black; a conductive fiber such as a carbon fiber or a metal fiber; a conductive tube such as a carbon nanotube; fluorocarbon; a metal powder such as an aluminum powder or a nickel powder; a conductive whisker such as zinc oxide or potassium titanate; a conductive metal oxide such as titanium oxide; and a polyphenylene derivative, and preferably includes carbon black in terms of realizing high conductivity.

The negative electrode conductive material may have a specific surface area of 80 $m^2/g$ to 200 $m^2/g$ and preferably 100 $m^2/g$ to 150 $m^2/g$ in terms of facilitating the dispersion of a negative electrode conductive material when preparing a slurry for forming a negative electrode active material layer and further improving electrical conductivity.

The negative electrode conductive material may be included in the negative electrode slurry in an amount of 5% to 20% by weight and preferably 7% to 15% by weight based on the solid content of the negative electrode slurry, and it is preferable that this range is satisfied so that an increase in resistance due to the negative electrode binder can be alleviated and an excellent conductive network can be formed.

The negative electrode slurry may additionally include a solvent for forming a negative electrode slurry to enable the mixing and dispersion of the silicon-based negative electrode active material, the negative electrode binder, and/or the negative electrode conductive material.

The solvent for forming a negative electrode slurry may include, for example, one or more selected from the group consisting of distilled water, ethanol, methanol, and isopropyl alcohol and preferably distilled water in terms of facilitating the dispersion of the silicon-based active material, the binder, and/or the conductive material.

The solid content of the negative electrode slurry may be 20% to 35% by weight and preferably 23% to 30% by weight, and when this range is satisfied, viscosity is lowered to an appropriate level, which is advantageous when applying a low-loading negative electrode active material layer.

When the applied negative electrode slurry is subjected to first roll-pressing, a negative electrode active material layer is formed.

In the first roll-pressing, it is required that the porosity of a negative electrode active material layer including a silicon-based active material is adjusted to be relatively high so that even when the negative active material layer is pre-lithiated, since the volume of the silicon-based active material does not rapidly expand, an electrical short circuit between the active materials is not intensified or the active material is not damaged.

The first roll-pressing may be carried out by pressing the applied negative electrode slurry by applying line pressure. Specifically, the first roll-pressing may be carried out using a roll press, for example, by placing a negative electrode current collector, on which the negative electrode slurry is applied, between two rollers of the roll press and applying pressure.

The porosity ($p_1$) of the negative electrode active material layer may be 35% to 52% and preferably 38% to 44% after the first roll-pressing. When this range is satisfied, even when the volume of the silicon-based active material is expanded due to the pre-lithiation to be described below, stress applied to the silicon-based active material can be minimized, and damage to the active material can be prevented. In addition, when the above range is satisfied, since the sudden volume expansion of the silicon-based active material or a sudden thickness change of the negative electrode active material layer can be prevented, an electrical short circuit between active materials can be prevented. In addition, when the above range is satisfied, the phenomenon of electrical contact between active materials being reduced due to excessively high porosity and the pre-lithiation to be described below thus being not smoothly achieved can be prevented.

In the present specification, the porosity ($p_1$) of the negative active material layer after the first roll-pressing can be calculated by the following Mathematical Formula 1.

Porosity of negative electrode active material layer after first roll-pressing (%)={1−(Electrode density of negative electrode active material layer after first roll-pressing/True density of negative electrode active material layer)}×100[Mathematical Formula 1]

In Mathematical Formula 1, the true density of a negative electrode active material layer is the density of the negative electrode active material layer measured by cutting the negative electrode active material layer to a specific size and pressing, using a press, the negative electrode active material layer to a point that the thickness of the layer no longer changes, and the electrode density of a negative electrode active material layer after the first roll-pressing is the density of the negative electrode active material layer measured by cutting the negative electrode active material layer to a specific size after the first roll-pressing.

The electrode density of a negative electrode active material layer after the first roll-pressing can be calculated by dividing the mass per area of the negative electrode active material layer after the first roll-pressing by the thickness of the negative electrode active material layer after the first roll-pressing.

The porosity of the negative electrode active material layer after the first roll-pressing can be realized by appropriately adjusting the gap between two rollers of a roll press used in the roll-pressing, the number of roll-pressing cycles, and the like.

The method of manufacturing a negative electrode of the present invention may additionally include drying the negative electrode active material layer after the first roll-pressing. Specifically, the drying may be carried out between the first roll-pressing process and the pre-lithiation process to be described below.

The drying may be carried out to remove the solvent for forming a negative electrode slurry which may remain in the negative electrode slurry applied on the negative electrode current collector or in the negative electrode active material layer.

The drying may be carried out at a temperature of 60° C. to 150° C. and preferably 100° C. to 140° C., and in this case, the solvent for forming a negative electrode slurry can be smoothly removed.

The drying may be carried out for 5 hours to 20 hours and preferably 8 hours to 15 hours.

<Pre-Lithiation>

The method of manufacturing a negative electrode of the present invention includes pre-lithiating the negative electrode active material layer.

The pre-lithiation may be performed on the negative electrode active material layer formed by the first roll-pressing, and as described above, since the first roll-pressing is carried out in such a manner that the negative electrode active material layer has relatively high porosity, even when lithium is intercalated into the silicon-based active material due to pre-lithiation, damage to the silicon-based active material due to sudden volume expansion can be prevented, and since a sudden thickness change is prevented, the occurrence of an electrical short circuit between active materials can be prevented.

The pre-lithiation may be carried out by electrochemically charging the negative electrode active material layer. When the electrochemical charging is performed, pre-lithiation in which lithium or lithium ions are intercalated into the silicon-based active material and thus the irreversible capacity of the silicon-based active material is removed is achieved.

Specifically, the pre-lithiation may be carried out by manufacturing a pre-lithiation cell including a negative electrode structure, a counter electrode facing the negative electrode structure, a separator interposed between the negative electrode structure and the counter electrode, and a pre-lithiation electrolyte and electrochemically charging the pre-lithiation cell. In this case, the negative electrode structure may include the negative electrode current collector and the negative electrode active material layer formed on the negative electrode current collector.

The counter electrode may be provided as a lithium source for transferring lithium ions to the negative electrode active material layer during the electrochemical charging carried out for pre-lithiating the negative electrode active material layer.

Specifically, the counter electrode may include a lithium source selected from among lithium metal and a lithium-transition metal composite oxide, and specifically, may include a lithium-transition metal composite oxide in terms of preventing lithium from precipitating in the form of a dendrite and improving the uniformity of pre-lithiation.

More specifically, the counter electrode may include a current collector and a lithium source layer formed on the current collector. The lithium source layer may include a lithium source selected from among lithium metal and a lithium-transition metal composite oxide and preferably includes a lithium-transition metal composite oxide.

The lithium-transition metal composite oxide may include a lithium-transition metal composite oxide including lithium and one or more transition metals selected from the group consisting of nickel, cobalt, manganese, and aluminum and preferably a lithium-transition metal composite oxide including lithium and a transition metal comprising nickel, cobalt, and manganese.

More specifically, the lithium-transition metal composite oxide may be a lithium-manganese-based oxide (e.g., $LiMnO_2$, $LiMn_2O_4$, etc.), a lithium-cobalt-based oxide (e.g., $LiCoO_2$, etc.), a lithium-nickel-based oxide (e.g., $LiNiO_2$, etc.), a lithium-nickel-manganese-based oxide (e.g., $LiNi_{1-Y}Mn_YO_2$ (here, $0<Y<1$), $LiMn_{2-z}Ni_zO_4$ (here, $0<Z<2$), etc.), a lithium-nickel-cobalt-based oxide (e.g., $LiNi_{1-Y1}Co_{Y1}O_2$ (here, $0<Y1<1$), etc.), a lithium-manganese-cobalt-based oxide (e.g., $LiCo_{1-Y2}Mn_{Y2}O_2$ (here, $0<Y2<1$), $LiMn_{2-Z1}Co_{Z1}O_4$ (here, $0<Z1<2$), etc.), a lithium-nickel-manganese-cobalt-based oxide (e.g., $Li(Ni_pCo_qMn_{r1})O_2$ (here, $0<p<1$, $0<q<1$, $0<r1<1$, and $p+q+r1=1$), $Li(Ni_{p1}Co_{q1}Mn_{r2})O_4$ (here, $0<p1<2$, $0<q1<2$, $0<r2<2$, and $p1+q1+r2=2$), etc.), or a lithium-nickel-cobalt-transition metal (M) oxide (e.g., $Li(Ni_{p2}Co_{q2}Mn_{r3}M_{S2})O_2$ (here, M is selected from the group consisting of Al, Fe, V, Cr, Ti, Ta, Mg and Mo, and p2, q2, r3 and s2 represent an atomic fraction of each independent element, and satisfy $0<p2<1$, $0<q2<1$, $0<r3<1$, $0<s2<1$, and $p2+q2+r3+s2=1$), etc.), and these compounds may be used alone or in combination of two or more thereof. In particular, to improve the capacity characteristics and stability of a battery, the lithium-transition metal composite oxide may be $LiCoO_2$, $LiMnO_2$, $LiNiO_2$, a lithium-nickel-manganese-cobalt-based oxide (e.g., $Li(Ni_{0.6}Mn_{0.2}Co_{0.2})O_2$, $Li(Ni_{0.5}Mn_{0.3}Co_{0.2})O_2$, $Li(Ni_{0.8}Mn_{0.1}Co_{0.1})O_2$, etc.), or a lithium-nickel-cobalt-aluminum-based oxide (e.g., $Li(Ni_{0.8}Co_{0.15}Al_{0.05})O_2$, etc.), and considering that the adjustment of the types and content ratio of constituent elements forming the lithium-transition metal composite oxide has a remarkable improvement effect, the lithium-transition metal composite oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, $Li(Ni_{0.8}Mn_{0.1}Co_{0.1})O_2$, or the like, and these compounds may be used alone or in combination of two or more thereof.

The lithium-transition metal composite oxide may be included in an amount of 80% to 99% by weight and preferably 92% to 98.5% by weight in the lithium source layer.

The lithium source layer may additionally include a binder for the binding of the lithium-transition metal composite oxide.

The binder may include one or more selected from the group consisting of PVdF, PVA, CMC, starch, hydroxypropyl cellulose, regenerated cellulose, polyvinylpyrrolidone, polytetrafluoroethylene, polyethylene, polypropylene, an EPDM, a sulfonated-EPDM, SBR, and fluororubber and preferably PVdF.

The binder may be included in an amount of 1% to 20% by weight and preferably 1.2% to 10% by weight in the lithium source layer in terms of sufficiently securing binding between components.

The lithium source layer may additionally include a conductive material to assist and improve the conductivity of the lithium source layer.

The conductive material is not particularly limited as long as it can be used to assist and improve the conductivity of the lithium source layer, does not cause a chemical change, and has conductivity. Specifically, the conductive material may include one or more selected from the group consisting of: graphite such as natural graphite or artificial graphite; carbon black such as acetylene black, Ketjen black, channel black, furnace black, lamp black, or thermal black; a conductive fiber such as a carbon fiber or a metal fiber; a conductive tube such as a carbon nanotube; fluorocarbon; a metal powder such as an aluminum powder or a nickel powder; a conductive whisker such as zinc oxide or potassium titanate; a conductive metal oxide such as titanium oxide; and a polyphenylene derivative, and preferably includes carbon black in terms of improving conductivity.

The conductive material may be included in an amount of 1% to 20% by weight and preferably 1.2% to 10% by weight in the lithium source layer in terms of sufficiently securing electrical conductivity.

As the separator, a separator that exhibits low resistance to lithium ion migration and has an excellent electrolyte impregnation ability is preferred. Specifically, the separator may include: a porous polymer film including one or more selected from the group consisting of an ethylene polymer, a propylene polymer, an ethylene/butene copolymer, an ethylene/hexene copolymer, an ethylene/methacrylate copolymer, and a polyolefin-based polymer; a porous non-woven fabric including one or more selected from the group consisting of a high-melting-point glass fiber and a polyethylene terephthalate fiber; or a combination of two or more thereof. The separator layer preferably includes a porous polymer film and more preferably includes a porous polymer film including a polyolefin-based polymer in terms of ensuring mechanical stability and chemical stability.

The thickness of the separator may be 3 to 50 μm and preferably 8 to 20 μm in terms of enabling the smooth intercalation/diffusion of lithium into a negative electrode active material layer and uniform pre-lithiation.

The electrolyte for pre-lithiation may include a lithium salt and an organic solvent.

The organic solvent is not particularly limited as long as it can serve as a medium for an electrochemical reaction and ion migration, and specifically, the organic solvent may be: an ester-based solvent such as methyl acetate, ethyl acetate, γ-butyrolactone, ε-caprolactone, or the like; an ether-based solvent such as dibutyl ether, tetrahydrofuran, or the like; a ketone-based solvent such as cyclohexanone or the like; an aromatic hydrocarbon-based solvent such as benzene, fluorobenzene, or the like; a carbonate-based solvent such as dimethyl carbonate (DMC), diethyl carbonate (DEC), methyl ethyl carbonate (MEC), ethyl methyl carbonate (EMC), ethylene carbonate (EC), propylene carbonate (PC), or the like; an alcohol-based solvent such as ethyl alcohol, isopropyl alcohol, or the like; a nitrile such as R—CN (R is a C2-C20 hydrocarbon group with a linear, branched, or cyclic structure and may include a double-bonded aromatic ring or an ether linkage) or the like; an amide such as dimethylformamide or the like; dioxolane such as 1,3-dioxolane or the like; or sulfolane. Among these, a carbonate-based solvent is preferable in terms of improving electrochemical stability, and specifically, EMC, EC, or the like is more preferable.

The lithium salt may include one or more selected from the group consisting of $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. LiCl, LiI, and $LiB(C_2O_4)_2$ and preferably includes $LiPF_6$.

The lithium salt may be used at a concentration of 0.1 M to 3 M and preferably 0.5 M to 1.5 M based on the pre-lithiation electrolyte, and it is preferable that the above range is satisfied so that the lithium salt can be sufficiently dissolved and thus lithium ions can be smoothly intercalated into an active material.

The pre-lithiation electrolyte may additionally include one or more selected from the group consisting of fluoroethylene carbonate (FEC), vinylene carbonate (VC), polystyrene (PS), succinonitrile, ethylene glycol bis(propionitrile) ether, and lithium bis(fluorosulfonyl)imide (LiFSI) and preferably an additive including FEC in terms of stabilizing a surface of a negative electrode active material during pre-lithiation so that pre-lithiation can be smoothly achieved.

The additive may be included in the pre-lithiation electrolyte in an amount of 0.1% to 15% and preferably 0.5% to 5% of the total weight of the pre-lithiation electrolyte in terms of stabilizing a surface of a negative electrode active material so that pre-lithiation can be smoothly achieved.

The pre-lithiation may be carried out by electrochemically charging the negative electrode active material layer with a current density of 0.2 $mA/cm^2$ to 10 $mA/cm^2$ and preferably 2 $mA/cm^2$ to 6 $mA/cm^2$, and when electrochemical charging is carried out with a current satisfying this range, uniform and stable pre-lithiation of a negative electrode active material can be achieved.

The pre-lithiation may be carried out by electrochemically charging the negative electrode active material layer so that the state-of-charge (SoC) of the negative electrode active material layer reaches 5% SoC to 35% SoC, preferably 15% SoC to 20% SoC, and more preferably 15.5% SoC to 18.0% SoC. It is preferable that the negative electrode active material layer is electrochemically charged to satisfy the above range so that the irreversible capacity of the silicon-based active material can be sufficiently removed, and volume expansion and an electrical short circuit between active materials, which may occur due to the excessive intercalation of lithium, can be prevented. The SoC of the negative electrode active material layer may be based on the initial discharge capacity (100% SoC) of the negative electrode active material layer.

The pre-lithiation may be performed while applying pressure to the pre-lithiation cell.

When the pre-lithiation is performed while applying pressure to the pre-lithiation cell, since the volume expansion of the silicon-based active material and the deformation of the negative electrode active material layer due to pre-lithiation can be prevented, lithium can be stably and uniformly intercalated into a negative electrode.

The applied pressure may be in the range of 0.1 MPa to 2.5 MPa, preferably 0.5 MPa to 1.5 MPa, and more preferably 0.8 MPa to 1.2 MPa, and it is preferable that this pressure is applied so that the deformation of the negative electrode active material layer can be prevented by appropriately controlling the volume expansion of the silicon-based active material, and the problem of damage to the silicon-based active material due to the application of excessive pressure can be prevented.

The application of pressure may be carried out by disposing a pre-lithiation cell between a pair of jigs or pressing plates and applying pressure to the pre-lithiation cell using the jigs.

The method of manufacturing a negative electrode of the present invention may additionally include separating the negative electrode structure from the pre-lithiation cell after pre-lithiation. If necessary, a process of washing and drying the separated negative electrode structure may also be carried out.

<Second Roll-Pressing>

The method of manufacturing a negative electrode of the present invention includes subjecting the pre-lithiated negative electrode active material layer to a second roll-pressing.

The second roll-pressing is a process of roll-pressing the negative electrode active material layer to a point of attaining desired porosity after the pre-lithiation. Since a negative electrode active material layer whose porosity has been adjusted to be relatively high by the first roll-pressing is pre-lithiated, the rapid volume expansion of the silicon-based active material and the rapid thickness change of the negative active material layer are prevented, and therefore, pre-lithiation can be smoothly achieved, and an electrical short circuit between active materials and damage to the active materials can be prevented. Since the second roll-pressing process of roll-pressing a negative electrode active material layer to a point of attaining desired porosity is carried out after the pre-lithiation process, not only can lifetime characteristics be improved due to pre-lithiation, but also a negative electrode having high energy density can be manufactured.

The second roll-pressing may be performed by pressing the pre-lithiated negative electrode active material layer by applying line pressure. Specifically, the second roll-pressing may be carried out using a roll press.

The porosity of the negative electrode active material layer may be 29% to 34% and preferably 31% to 33% after the second roll-pressing. It is preferable that this range is satisfied so that lifetime characteristics can be improved through pre-lithiation, voids can be suitably secured in the negative electrode active material layer to allow an electrolyte to flow in or out easily and facilitate electrolyte impregnation, and a conductive network formed between active materials can be improved to a desirable level.

The porosity ($p_2$) of the negative electrode active material layer after the second roll-pressing can be calculated by the following Mathematical Formula 2.

Porosity of negative electrode active material layer after second roll-pressing (%)={1−(Electrode density of negative electrode active material layer after second roll-pressing/True density of negative electrode active material layer)}×100 [Mathematical Formula 2]

In Mathematical Formula 2, the true density of a negative electrode active material layer is the density of the negative electrode active material layer measured by cutting the negative electrode active material layer to a specific size and pressing, using a press, the negative electrode active material layer to a point that the thickness of the layer no longer changes, and the electrode density of a negative electrode active material layer after the second roll-pressing is the density of the negative electrode active material layer measured by cutting the negative electrode active material layer to a specific size after the second roll-pressing.

The electrode density of a negative electrode active material layer after the second roll-pressing can be calculated by dividing the mass per area of the negative electrode active material layer after the second roll-pressing by the thickness of the negative electrode active material layer after the second roll-pressing. In regard to the mass per area of the negative electrode active material layer after the second roll-pressing, for the convenience of calculation, the weight of the negative electrode active material layer can be measured while disregarding the weight of lithium or lithium ions intercalated into the silicon-based active material due to pre-lithiation, and specifically, the porosity of the negative active material layer after the second roll-pressing can be measured and calculated while assuming that the mass per area of the negative active material layer after the second roll-pressing and the mass per area of the negative active material layer after the first roll-pressing are the same. For example, in Mathematical Formula 2, the electrode density of the negative electrode active material layer after the second roll-pressing may be a value obtained by multiplying the electrode density of the negative active material layer after the first roll-pressing by "the ratio of negative electrode active material layer thickness after the first roll-pressing to negative electrode active material layer thickness after the second roll-pressing."

The porosity of the negative electrode active material layer after the second roll-pressing can be realized by appropriately adjusting the gap between two rollers of a roll press used in the roll-pressing, the number of roll-pressing cycles, and the like.

The thickness of the negative electrode active material layer may be 10 μm to 100 μm and preferably 15 μm to 40 μm after the second roll-pressing.

In the method of manufacturing a negative electrode of the present invention, the ratio ($p_1/p_2$) of porosity ($p_1$) of negative electrode active material layer after the first roll-pressing to porosity ($p_2$) of negative electrode active material layer after the second roll-pressing is in the range of 1.05 to 1.65.

When the ratio ($p_1/p_2$) of porosity ($p_1$) of negative electrode active material layer after the first roll-pressing to porosity ($p_2$) of negative electrode active material layer after the second roll-pressing is adjusted as described above, since the negative electrode active material layer is roll-pressed to a point of attaining relatively high porosity during first roll-pressing, the risk of occurrence of an electrical short circuit due to the volume expansion of active materials after pre-lithiation can be eliminated, and the damage to the active materials can be prevented, and since the negative electrode active material layer is roll-pressed to a point of attaining desired porosity during second roll-pressing performed after pre-lithiation, a negative electrode having high energy density and improved lifetime characteristics can be manufactured.

When $p_1/p_2$ is less than 1.05, it can be evaluated that first roll-pressing has been excessively performed or second roll-pressing has not been sufficiently performed. When first roll-pressing is excessively performed, since the volume of the silicon-based active material expands due to pre-lithiation, causing excessive stress, active materials are damaged, and since an electrical short circuit occurs between active materials due to rapid volume expansion resulting from pre-lithiation, lifetime characteristics are degraded. In addition, when excessive first roll-pressing is performed, the porosity of the negative electrode active material layer may be uneven in that the porosity of the negative electrode active material layer is low in a surface portion and high in the inside of the negative electrode active material layer, and in this case, since lithium may be intercalated into the negative electrode active material layer in such a manner that it is concentrated in the surface portion, a side reaction of an electrolyte may occur at the surface portion. In addition, when second roll-pressing is not sufficiently performed, it is difficult to improve the electrical connectivity of the silicon-based active materials whose volume has expanded due to pre-lithiation, and the energy density of a negative electrode cannot be improved to a desired level.

When $p_1/p_2$ exceeds 1.65, it can be evaluated that first roll-pressing has not been sufficiently performed, and in this case, since the porosity of the negative electrode active material layer is high, electrical connectivity between active materials is reduced, and since it is difficult to form a uniform conductive network, resistance to lithium migration is increased, making it difficult to achieve uniform and stable pre-lithiation.

Preferably, $p_1/p_2$ may be in the range of 1.08 to 1.55 and more preferably 1.2 to 1.4, when this range is satisfied, stress applied to the silicon-based active material due to pre-lithiation can be minimized, and a conductive network can optimally form between the active materials, and a negative electrode having a uniform pore structure and high energy density can be manufactured through second roll-pressing.

<Secondary Battery>

Another aspect of the present invention provides a secondary battery, specifically, a lithium secondary battery, which includes a negative electrode manufactured by the above-described method of manufacturing a negative electrode.

Specifically, the secondary battery may include: a negative electrode manufactured by the method of manufacturing a negative electrode; a positive electrode opposite to the negative electrode; a separator interposed between the negative electrode and the positive electrode; and an electrolyte.

The positive electrode may include a positive electrode current collector and a positive electrode active material layer formed on the positive electrode current collector.

The positive electrode current collector is not particularly limited as long as it does not cause a chemical change in a battery and has high conductivity. Specifically, as the positive electrode current collector, copper, stainless steel, aluminum, nickel, titanium, calcined carbon, copper or stainless steel whose surface has been treated with carbon, nickel, titanium, silver, or the like, an aluminum-cadmium alloy, or the like may be used.

The positive electrode current collector may typically have a thickness of 3 to 500 μm.

The positive electrode current collector may have fine irregularities formed in a surface thereof to increase the adhesion of a positive electrode active material. For example, the positive electrode current collector may be used in any of various forms such as a film, a sheet, a foil, a net, a porous material, a foam, a non-woven fabric, and the like.

The positive electrode active material layer may include a positive electrode active material.

The positive electrode active material may include a compound enabling the reversible intercalation and deintercalation of lithium and, specifically, may include a lithium-transition metal composite oxide including lithium and one or more transition metals selected from the group consisting of nickel, cobalt, manganese, and aluminum and preferably a lithium-transition metal composite oxide including lithium and a transition metal comprising nickel, cobalt, and manganese.

More specifically, the lithium-transition metal composite oxide may be a lithium-manganese-based oxide (e.g., $LiMnO_2$, $LiMn_2O_4$, etc.), a lithium-cobalt-based oxide (e.g., $LiCoO_2$, etc.), a lithium-nickel-based oxide (e.g., $LiNiO_2$, etc.), a lithium-nickel-manganese-based oxide (e.g., $LiNi_{1-Y}Mn_YO_2$ (here, $0<Y<1$), $LiMn_{2-z}Ni_zO_4$ (here, $0<Z<2$), etc.), a lithium-nickel-cobalt-based oxide (e.g., $LiNi_{1-Y1}Co_{Y1}O_2$ (here, $0<Y1<1$), etc.), a lithium-manganese-cobalt-based oxide (e.g., $LiCo_{1-Y2}Mn_{Y2}O_2$ (here, 0<Y2<1), $LiMn_{2-Z1}Co_{Z1}O_4$ (here, 0<Z1<2), etc.), a lithium-nickel-manganese-cobalt-based oxide (e.g., $Li(Ni_pCo_qMn_{r1})O_2$ (here, 0<p<1, 0<q<1, 0<r1<1, and p+q+r1=1), $Li(Ni_{p1}Co_{q1}Mn_{r2})O_4$ (here, 0<p1<2, 0<q1<2, 0<r2<2, and p1+q1+r2=2), etc.), or a lithium-nickel-cobalt-transition metal (M) oxide (e.g., $Li(Ni_{p2}Co_{q2}Mn_{r3}M_{S2})O_2$ (here, M is selected from the group consisting of Al, Fe, V, Cr, Ti, Ta, Mg and Mo, and p2, q2, r3 and s2 represent an atomic fraction of each independent element, and satisfy 0<p2<1, 0<q2<1, 0<r3<1, 0<s2<1, and p2+q2+r3+s2=1), etc.), and these compounds may be used alone or in combination of two or more thereof. In particular, to improve the capacity characteristics and stability of a battery, the lithium-transition metal composite oxide may be $LiCoO_2$, $LiMnO_2$, $LiNiO_2$, a lithium-nickel-manganese-cobalt-based oxide (e.g., $Li(Ni_{0.6}Mn_{0.2}Co_{0.2})O_2$, $Li(Ni_{0.5}Mn_{0.3}Co_{0.2})O_2$, $Li(Ni_{0.8}Mn_{0.1}Co_{0.1})O_2$, etc.), or a lithium-nickel-cobalt-aluminum-based oxide (e.g., $Li(Ni_{0.8}Co_{0.1}Al_{0.05})O_2$, etc.), and considering that the adjustment of the types and content ratio of constituent elements forming the lithium-transition metal composite oxide has a remarkable improvement effect, the lithium-transition metal composite oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, $Li(Ni_{0.8}Mn_{0.1}Co_{0.1})O_2$, or the like, and these compounds may be used alone or in combination of two or more thereof.

The positive electrode active material may be included in an amount of 80% to 99% by weight and preferably 92% to 98.5% by weight in the positive electrode active material layer in consideration of the sufficient realization of the capacity of the positive electrode active material and the like.

The positive electrode active material layer may include a binder and/or a conductive material in addition to the above-described positive electrode active material.

The binder is a component that aids in the binding of an active material with a conductive material and the like and with a current collector and, specifically, may include one or more selected from the group consisting of PVdF, PVA, CMC, starch, hydroxypropyl cellulose, regenerated cellulose, polyvinylpyrrolidone, polytetrafluoroethylene, polyethylene, polypropylene, an EPDM, a sulfonated-EPDM, SBR, and fluororubber and preferably PVdF.

The binder may be included in an amount of 1% to 20% by weight and preferably 1.2% to 10% by weight in the positive electrode active material layer in terms of sufficiently securing binding between components such as a positive electrode active material.

The conductive material may be used to assist and improve conductivity in a secondary battery, and is not particularly limited as long as it does not cause a chemical change and has conductivity. Specifically, the conductive material may include one or more selected from the group consisting of graphite such as natural graphite or artificial graphite; carbon black such as acetylene black, Ketjen black, channel black, furnace black, lamp black, or thermal black; a conductive fiber such as a carbon fiber or a metal fiber; a conductive tube such as a carbon nanotube; fluorocarbon; a metal powder such as an aluminum powder or a nickel powder; a conductive whisker such as zinc oxide or potassium titanate; a conductive metal oxide such as titanium oxide; and a polyphenylene derivative, and preferably includes carbon black in terms of improving conductivity.

The conductive material may have a specific surface area of 80 $m^2/g$ to 200 $m^2/g$ and preferably 100 $m^2/g$ to 150 $m^2/g$ in terms of facilitating the dispersion of a conductive material when preparing a slurry for forming a positive electrode active material layer and further improving electrical conductivity.

The conductive material may be included in an amount of 1% to 20% by weight and preferably 1.2% to 10% by weight in the positive electrode active material layer in terms of sufficiently securing electrical conductivity.

The thickness of the positive electrode active material layer may be in the range of 30 μm to 400 μm and preferably 50 μm to 110 μm.

The positive electrode may be manufactured by applying, on the positive electrode current collector, a positive electrode slurry including a positive electrode active material and optionally a binder, a conductive material, and a solvent for forming a positive electrode slurry, and then carrying out drying and roll-pressing.

The solvent for forming a positive electrode slurry may include an organic solvent such as N-methyl-2-pyrrolidone (NMP), and may be used in an amount capable of resulting in desirable viscosity when the positive electrode active material and optionally a binder, a conductive material, and the like are included. For example, the solvent for forming a positive electrode slurry may be included in the positive electrode slurry in such an amount that the concentration of solid content including the positive electrode active material and optionally a binder and a conductive material becomes 50% to 95% by weight and preferably 70% to 90% by weight.

The porosity of the positive electrode active material layer may be in the range of 20% to 35%. The porosity of the positive electrode active material layer can be measured using the method of measuring the porosity of a negative electrode active material layer described in the above Mathematical Formula 1.

The separator is used to separate the negative electrode and the positive electrode and provide a passage for lithium ion migration, and any separator commonly used in a lithium secondary battery may be used without particular limitation, and in particular, a separator that exhibits low resistance to the migration of electrolyte ions and has an excellent electrolyte impregnation ability is preferred.

Specifically, a porous polymer film, for example, a porous polymer film formed of a polyolefin-based polymer such as an ethylene homopolymer, a propylene homopolymer, an ethylene/butene copolymer, an ethylene/hexene copolymer, or an ethylene/methacrylate copolymer or a stacked structure having two or more layers thereof, may be used. In addition, a common porous non-woven fabric, for example, a non-woven fabric made of a high-melting-point glass fiber, a polyethylene terephthalate fiber, or the like, may be used. Also, in order to ensure heat resistance or mechanical strength, a coated separator that includes a ceramic component or polymer material and is optionally in a single-layer or multi-layer structure may be used.

In addition, examples of the electrolyte used in the present invention may include an organic liquid electrolyte, an inorganic liquid electrolyte, a solid polymer electrolyte, a gel-type polymer electrolyte, an inorganic solid electrolyte, a molten-type inorganic electrolyte, and the like which are usable for manufacturing a secondary battery, but the present invention is not limited thereto.

Specifically, the electrolyte may include an organic solvent and a lithium salt.

As the organic solvent, any organic solvent that can serve as a medium through which ions involved in an electrical reaction of a battery can move may be used without particular limitation. Specifically, as the organic solvent, an ester-based solvent such as methyl acetate, ethyl acetate, gamma-butyrolactone, or ε-caprolactone, an ether-based solvent such as dibutyl ether or tetrahydrofuran, a ketone-based solvent such as cyclohexanone, an aromatic hydrocarbon-based solvent such as benzene or fluorobenzene, a carbonate-based solvent such as DMC, DEC, EMC, EC, or PC, an alcohol-based solvent such as ethyl alcohol or isopropyl alcohol, a nitrile such as R—CN (R is a C2-C20 hydrocarbon group having a linear, branched, or cyclic structure and may include a double-bonded aromatic ring or an ether bond), an amide such as dimethylformamide, a dioxolane such as 1,3-dioxolane, a sulfolane, or the like may be used. Among these, a carbonate-based solvent is preferable, and a combination of a cyclic carbonate having high ionic conductivity and a high dielectric constant, which is capable of improving the charging/discharging performance of a battery (e.g., EC, PC, etc.), and a linear carbonate-based compound having low viscosity (e.g., EMC, DMC, DEC, etc.) is more preferable. In this case, when the cyclic carbonate and the linear carbonate are mixed in a volume ratio of about 1:1 to about 1:9 and used, the performance of the electrolyte can be excellent.

As the lithium salt, any compound capable of providing lithium ions used in a lithium secondary battery may be used without particular limitation. Specifically, as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$, or the like may be used. The lithium salt is preferably used at a concentration within the range of 0.1 to 2.0 M. When the concentration of the lithium salt satisfies the above range, since the electrolyte has appropriate conductivity and viscosity, the performance of the electrolyte can be excellent, and the lithium ions can effectively move.

The secondary battery may be manufactured according to a conventional method of manufacturing a secondary battery, by interposing a separator between the above-described negative electrode and positive electrode and then injecting an electrolyte.

The secondary battery of the present invention is useful in the field of portable devices such as mobile phones, laptop computers, and digital cameras and electric vehicles (EVs) such as hybrid electric vehicles (HEVs), and is particularly preferably useful as a constituent battery for a medium-to-large-sized battery module. Therefore, still another aspect of the present invention provides a medium-to-large-sized battery module including the secondary battery as a unit battery.

Such a medium-to-large-sized battery module is preferably applicable to a power source requiring high output and large capacity, such as an EV, an HEV, or a power storage device.

Hereinafter, exemplary embodiments of the present invention will be described in detail so that those of ordinary skill in the art can easily implement the present invention. However, the present invention may be implemented in various different forms and is not limited to the embodiments described herein.

EXAMPLES

Example 1: Manufacture of Negative Electrode

<First Roll-Pressing>

Si (average particle diameter ($D_{50}$): 3 μm) as a silicon-based active material used as a negative electrode active material, carbon black (product name: Super C65, manufacturer: Timcal Ltd.) as a conductive material, and a copolymer of PVA and PAA as a binder were added, at a weight ratio of 75:10:15, to a solvent for forming a negative electrode slurry (distilled water), and thereby a negative electrode slurry was obtained (solid content concentration: 25% by weight).

The negative electrode slurry was applied, with a loading amount of 68.4 mg/25 $cm^2$, on one side of a copper current collector (thickness: 8 μm) used as a negative electrode current collector and subjected to first roll-pressing using a roll press, and thereby a negative electrode active material layer was formed (thickness: 22.0 μm). The first roll-pressing was performed twice, by adjusting the gap between rollers of the roll press to 1.15 μm for the first time and then to 1.25 μm for the second time. Subsequently, the resultant was dried in a 130° C. vacuum oven for 10 hours.

After first roll-pressing, the porosity of the negative electrode active material layer was 39.8%. The porosity of the negative electrode active material layer after the first roll-pressing was calculated by the following Mathematical Formula 1.

Porosity of negative electrode active material layer after first roll-pressing (%)={1−(Electrode density of negative electrode active material layer after first roll-pressing/True density of negative electrode active material layer)}×100 [Mathematical Formula 1]

In Mathematical Formula 1, the true density of a negative electrode active material layer is the density of the negative electrode active material layer measured by cutting the negative electrode active material layer to a specific size and pressing, using a press, the negative electrode active material layer to a point that the thickness of the layer no longer changes, and the electrode density of a negative electrode active material layer after the first roll-pressing is the density of the negative electrode active material layer measured by cutting the negative electrode active material layer to a specific size after the first roll-pressing.

In the case of Example 1, the true density of the negative electrode active material layer was 2.06 g/$cm^3$, and the electrode density of the negative electrode active material layer after first roll-pressing was 1.24 g/$cm^3$.

<Pre-Lithiation>

1. Manufacture of Pre-Lithiation Cell $LiNi_{0.6}Co_{0.2}Mn_{0.2}O_2$ (average particle diameter ($D_{50}$): 11.5 μm) as a lithium-transition metal composite oxide, carbon black (product name: Super C65, manufacturer: Timcal Ltd.) as a conductive material, and PVdF as a binder were added, at a weight ratio of 97:1.5:1.5, to NMP used as a solvent for forming a positive electrode slurry, and thereby a slurry was obtained (solid content concentration: 78% by weight).

The slurry was applied, with a loading amount of 460 mg/$cm^2$, on one side of an aluminum current collector (thickness: 12 μm) used as a current collector, roll-pressed, and dried in a 130° C. vacuum oven for 10 hours to form a lithium source layer (thickness: 54 μm), which was then used as a counter electrode for a negative electrode (counter electrode thickness: 66 μm, porosity: 24%).

A polyethylene separator was interposed between the negative electrode manufactured in the above and the counter electrode, and an electrolyte was injected, and thereby a pre-lithiation cell of Example 1 was manufactured. As the electrolyte, a solution prepared by adding, to an organic solvent in which FEC and DMC were mixed in a volume ratio of 30:70, VC in an amount of 3% by weight of the total weight of the electrolyte and $LiPF_6$ as a lithium salt at a concentration of 1 M was used.

2. Pre-Lithiation

The negative electrode active material layer was pre-lithiated by charging the pre-lithiation cell in a CC mode at 0.1 C (based on counter electrode capacity) using an electrochemical charger/discharger. The pre-lithiation cell was electrochemically charged while being pressurized with a pressure of 0.9 MPa using a Jig for applying pressure. The negative electrode active material layer was electrochemically charged to 16.51% SoC based on the initial discharge capacity of the negative electrode active material layer.

After pre-lithiation, a pre-lithiated negative electrode was separated from the pre-lithiation cell and washed and dried.

<Second Roll-Pressing>

Subsequently, the negative electrode active material layer was subjected to second roll-pressing. After second roll-pressing, the thickness of the negative electrode active material layer was 19.5 μm. The second roll-pressing was performed twice, by adjusting the gap between rollers of a roll press then to 0.72 μm for the first time and to 1.04 μm for the second time. The porosity of the negative electrode active material layer after the second roll-pressing was 32.0%, as calculated by the following Mathematical Formula 2.

Porosity of negative electrode active material layer after second roll-pressing (%)={1−(Electrode density of negative electrode active material layer after second roll-pressing/True density of negative electrode active material layer)}×100 [Mathematical Formula 2]

In Mathematical Formula 2, the true density of a negative electrode active material layer is the density of the negative electrode active material layer measured by cutting the negative electrode active material layer to a specific size and pressing, using a press, the negative electrode active material layer to a point that the thickness of the layer no longer changes, and the electrode density of a negative electrode active material layer after the second roll-pressing is the density of the negative electrode active material layer measured by cutting the negative electrode active material layer to a specific size after the second roll-pressing.

In Mathematical Formula 2, the electrode density of the negative electrode active material layer after the second roll-pressing was calculated by dividing the mass per area of the negative electrode active material layer after the second roll-pressing by the thickness of the negative electrode active material layer after the second roll-pressing. In this case, for the convenience of calculation, it is assumed that the mass per area of the negative active material layer after the second roll-pressing was the same as the mass per area of the negative active material layer after the first roll-pressing.

In the case of Example 1, the true density of the negative electrode active material layer was 2.06 g/cm$^3$, and the electrode density of the negative electrode active material layer after the second roll-pressing was 1.40 g/cm$^3$.

Example 2: Manufacture of Negative Electrode

In Example 2, a negative electrode was manufactured in the same manner as in Example 1 except that pre-lithiation was carried out by electrochemically charging the negative electrode active material layer to 19.46% SoC based on the initial discharge capacity of the negative electrode active material layer.

In Example 2, the porosity of the negative electrode active material layer after first roll-pressing was 39.8%, and the porosity of the negative electrode active material layer after second roll-pressing was 32.0%.

In the case of Example 2, the electrode density of the negative electrode active material layer after first roll-pressing was 1.24 g/cm$^3$, the thickness of the negative electrode active material layer after first roll-pressing was 22.0 μm, the electrode density of the negative electrode active material layer after second roll-pressing was 1.40 g/cm$^3$, the thickness of the negative electrode active material layer after second roll-pressing was 19.5 μm, and the true density of the negative electrode active material layer was 2.06 g/cm$^3$.

Example 3: Manufacture of Negative Electrode

In Example 3, a negative electrode was manufactured in the same manner as in Example 1 except that first roll-pressing was performed twice by adjusting the gap between rollers of the roll press then to 1.17 μm for the first time and to 2.10 μm for the second time.

In Example 3, the porosity of the negative electrode active material layer after the first roll-pressing was 48.1%, and the porosity of the negative electrode active material layer after the second roll-pressing was 32.0%.

In the case of Example 3, the electrode density of the negative electrode active material layer after the first roll-pressing was 1.07 g/cm$^3$, the thickness of the negative electrode active material layer after the first roll-pressing was 25.5 μm, the electrode density of the negative electrode active material layer after the second roll-pressing was 1.40 g/cm$^3$, the thickness of the negative electrode active material layer after the second roll-pressing was 19.5 μm, and the true density of the negative electrode active material layer was 2.06 g/cm$^3$.

Example 4: Manufacture of Negative Electrode

In Example 4, a negative electrode was manufactured in the same manner as in Example 1 except that first roll-pressing was performed twice by adjusting the gap between rollers of the roll press then to 0.73 μm for the first time and to 0.97 μm for the second time.

In Example 4, the porosity of the negative electrode active material layer after the first roll-pressing was 35.4%, and the porosity of the negative electrode active material layer after the second roll-pressing was 32.0%.

In the case of Example 4, the electrode density of the negative electrode active material layer after the first roll-pressing was 1.33 g/cm$^3$, the thickness of the negative electrode active material layer after the first roll-pressing was 20.5 μm, the electrode density of the negative electrode active material layer after the second roll-pressing was 1.40 g/cm$^3$, the thickness of the negative electrode active material layer after the second roll-pressing was 19.5 μm, and the true density of the negative electrode active material layer was 2.06 g/cm$^3$.

Comparative Example 1: Manufacture of Negative Electrode

In Comparative Example 1, a negative electrode was manufactured in the same manner as in Example 1 except that pre-lithiation was carried out by electrochemically charging to 15.17% SoC based on the initial discharge capacity of the negative electrode active material layer, and second roll-pressing was not performed.

In the case of Comparative Example 1, the thickness of the negative electrode active material layer after pre-lithiation was 28.8 μm.

Comparative Example 2: Manufacture of Negative Electrode

In Comparative Example 2, a negative electrode was manufactured in the same manner as in Example 1 except that pre-lithiation was carried out by electrochemically charging to 17.99% SoC based on the initial discharge capacity of the negative electrode active material layer, and second roll-pressing was not performed.

In the case of Comparative Example 2, the thickness of the negative electrode active material layer after pre-lithiation was 30.2 μm.

Comparative Example 3: Manufacture of Negative Electrode

In Comparative Example 3, a negative electrode was manufactured in the same manner as in Example 1 except that pre-lithiation was carried out by electrochemically charging to 20.81% SoC based on the initial discharge capacity of the negative electrode active material layer, and second roll-pressing was not performed.

In the case of Comparative Example 3, the thickness of the negative electrode active material layer after pre-lithiation was 31.5 μm.

Comparative Example 4: Manufacture of Negative Electrode

In Comparative Example 4, a negative electrode was manufactured in the same manner as in Example 1 except that first roll-pressing was not performed, and pre-lithiation and roll-pressing (performed under the same conditions as the second roll-pressing of Example 1) were performed.

In Comparative Example 4, the porosity of the negative electrode active material layer before the pre-lithiation was 55.8%, and porosity after the roll-pressing was 32%.

In the case of Comparative Example 4, the electrode density of the negative electrode active material layer before the pre-lithiation was 0.91 g/cm$^3$, the thickness of the negative electrode active material layer before the pre-lithiation was 30.0 μm, the electrode density of the negative electrode active material layer after the roll-pressing was 1.40 g/cm$^3$, the thickness of the negative electrode active material layer after the roll-pressing was 19.5 μm, and the true density of the negative electrode active material layer was 2.06 g/cm$^3$.

Comparative Example 5: Manufacture of Negative Electrode

In Comparative Example 5, a negative electrode was manufactured in the same manner as in Example 1 except that first roll-pressing was performed twice by adjusting the gap between rollers of the roll press to 0.55 μm for the first time and then to 0.71 μm for the second time.

In Comparative Example 5, the porosity of the negative electrode active material layer after the first roll-pressing was 30.3%, and the porosity of the negative electrode active material layer after the second roll-pressing was 32.0%.

In the case of Comparative Example 5, the electrode density of the negative electrode active material layer after the first roll-pressing was 1.44 g/cm$^3$, the thickness of the negative electrode active material layer after the first roll-pressing was 19.0 μm, the electrode density of the negative electrode active material layer after the second roll-pressing was 1.40 g/cm$^3$, the thickness of the negative electrode active material layer after the second roll-pressing was 19.5 μm, and the true density of the negative electrode active material layer was 2.06 g/cm$^3$.

Comparative Example 6: Manufacture of Negative Electrode

In Comparative Example 6, a negative electrode was manufactured in the same manner as in Example 1 except that first roll-pressing was performed twice by adjusting the gap between rollers of the roll press then to 0.62 μm for the first time and to 0.80 μm for the second time.

In Comparative Example 6, the porosity of the negative electrode active material layer after the first roll-pressing was 32.0%, and the porosity of the negative electrode active material layer after the second roll-pressing was 32.0%.

In the case of Comparative Example 6, the electrode density of the negative electrode active material layer after the first roll-pressing was 1.40 g/cm$^3$, the thickness of the negative electrode active material layer after the first roll-pressing was 19.5 μm, the electrode density of the negative electrode active material layer after the second roll-pressing was 1.40 g/cm$^3$, the thickness of the negative electrode active material layer after the second roll-pressing was 19.5 μm, and the true density of the negative electrode active material layer was 2.06 g/cm$^3$.

TABLE 1

| | First roll-pressing | | | Second roll-pressing | | | |
|---|---|---|---|---|---|---|---|
| Classification | Whether or not first roll-pressing was performed | Porosity of negative active material layer after first roll-pressing ($p_1$) (%) | Porosity of negative active material layer before pre-lithiation (%) | Whether or not second roll-pressing was performed | Porosity of negative active material layer after second roll-pressing ($p_2$) (%) | $p_1/p_2$ | SoC of negative electrode active material layer after pre-lithiation (based on initial discharge capacity of negative electrode active material layer) (%) |
| Example 1 | ○ | 39.8 | 39.8 | ○ | 32.0 | 1.25 | 16.51 |
| Example 2 | ○ | 39.8 | 39.8 | ○ | 32.0 | 1.25 | 19.46 |
| Example 3 | ○ | 48.1 | 48.1 | ○ | 32.0 | 1.51 | 16.51 |
| Example 4 | ○ | 35.4 | 35.4 | ○ | 32.0 | 1.10 | 16.51 |
| Comparative Example 1 | ○ | 39.8 | 39.8 | X | — | — | 15.17 |
| Comparative Example 2 | ○ | 39.8 | 39.8 | X | — | — | 17.99 |
| Comparative Example 3 | ○ | 39.8 | 39.8 | X | — | — | 20.81 |

TABLE 1-continued

| Classification | First roll-pressing: Whether or not first roll-pressing was performed | First roll-pressing: Porosity of negative active material layer after first roll-pressing ($p_1$) (%) | Porosity of negative active material layer before pre-lithiation (%) | Second roll-pressing: Whether or not second roll-pressing was performed | Second roll-pressing: Porosity of negative active material layer after second roll-pressing ($p_2$) (%) | $p_1/p_2$ | SoC of negative electrode active material layer after pre-lithiation (based on initial discharge capacity of negative electrode active material layer) (%) |
|---|---|---|---|---|---|---|---|
| Comparative Example 4 | X | — | 55.8 | ○ | 32.0 | 1.74 | 16.51 |
| Comparative Example 5 | ○ | 30.3 | 30.3 | ○ | 32.0 | 0.95 | 16.51 |
| Comparative Example 6 | ○ | 32.0 | 32.0 | ○ | 32.0 | 1.00 | 16.51 |

EXPERIMENTAL EXAMPLES

<Manufacture of Secondary Battery>

Manufacture of Positive Electrode $LiNi_{0.6}Co_{0.2}Mn_{0.2}O_2$ (average particle diameter ($D_{50}$): 11.5 μm) as a positive electrode active material, carbon black (product name: Super C65, manufacturer: Timcal Ltd.) as a positive electrode conductive material, and PVdF as a positive electrode binder were added, at a weight ratio of 97:1.5:1.5, to NMP used as a solvent for forming a positive electrode slurry, and thereby a positive electrode slurry was obtained (solid content concentration: 78% by weight).

The positive electrode slurry was applied, with a loading amount of 460 mg/cm$^2$, on one side of an aluminum current collector (thickness: 12 μm) used as a positive electrode current collector, roll-pressed, and dried in a 130° C. vacuum oven for 10 hours to form a positive electrode active material layer (thickness: 54 μm), which was then used as a positive electrode of Example 1 (positive electrode thickness: 66 μm, porosity: 24%).

2. Manufacture of Secondary Battery

A polyethylene separator was interposed between the negative electrode manufactured in the above and the positive electrode, and an electrolyte was injected, and thereby a secondary battery of Example 1 was manufactured. As the electrolyte, a solution prepared by adding, to an organic solvent in which FEC and DMC were mixed in a volume ratio of 30:70, VC in an amount of 3% by weight of the total weight of the electrolyte and $LiPF_6$ as a lithium salt at a concentration of 1 M was used.

Secondary batteries of Examples 2 to 4 and Comparative Examples 1 to 6 were manufactured in the same manner as above except that the negative electrodes of Examples 2 to 4 and Comparative Examples 1 to 6 were used.

Experimental Example 1: Evaluation of Capacity Retention Rate

The capacity retention rates of the secondary batteries manufactured in Examples 1 to 4 and Comparative Examples 1 to 6 were evaluated using an electrochemical charger/discharger.

The secondary batteries were charged and discharged under the following conditions.

In the first cycle: charging (0.2 C CC/CV charging, 4.2 V, 0.05 C cut-off), discharging (0.2 C CC discharging, 3.2 V cut-off)

In the second cycle and thereafter: charging (1.0 C CC/CV charging, 4.2 V, 0.05 C cut-off), discharging (0.5 C CC discharging, 3.2 V cut-off)

The capacity retention rate was evaluated by Equation 2 below. In the secondary batteries manufactured in Examples 1 to 4 and Comparative Examples 1 to 6, the number of cycles until a capacity retention rate of 80% was reached is shown in Table 2 below.

$$\text{Capacity retention rate (\%)} = (\text{Discharge capacity at } N^{th} \text{ cycle}) / (\text{Discharge capacity at } 1^{st} \text{ cycle}) \times 100 \quad \text{[Equation 2]}$$

TABLE 2

| | Number of cycles until 80% capacity retention rate |
|---|---|
| Example 1 | 240 |
| Example 2 | 209 |
| Example 3 | 181 |
| Example 4 | 224 |
| Comparative Example 1 | 137 |
| Comparative Example 2 | 108 |
| Comparative Example 3 | 92 |
| Comparative Example 4 | 62 |
| Comparative Example 5 | 105 |
| Comparative Example 6 | 119 |

Referring to Table 2, in the case of Examples 1 to 4 in which first roll-pressing, pre-lithiation, and second roll-pressing were carried out and the ratio ($p_1/p_2$) of porosity ($p_1$) of negative electrode active material layer after first roll-pressing to porosity ($p_2$) of negative electrode active material layer after second roll-pressing was adjusted to a desirable level, it can be seen that an excellent capacity retention rate as compared to Comparative Examples 1 to 6 was exhibited.

Experimental Example 2: Evaluation of Energy Density

The secondary batteries manufactured in Examples 1 to 4 and Comparative Examples 1 to 6 were charged and discharged once under the following conditions, and the discharge capacities (units: Wh) of the secondary batteries were determined.

In this case, the thicknesses of the secondary batteries after charging was completed were measured, and the measured thicknesses of the secondary batteries were multiplied by the areas of the secondary batteries to determine the volumes of the secondary batteries (units: liter (L)).

The discharge capacities of the secondary batteries determined in the above were divided by the volumes of the secondary batteries to calculate energy density (units: Wh/L). The results are shown in Table 3 below.

<Charging and Discharging Conditions>

Charging: CC/CV charging, 0.33 C, 4.2 V, 5% cut-off

Discharging: CC discharging, 0.33 C, 3.2 V

TABLE 3

| | Energy density (Wh/L) |
|---|---|
| Example 1 | 694 |
| Example 2 | 732 |
| Example 3 | 671 |
| Example 4 | 680 |
| Comparative Example 1 | 657 |
| Comparative Example 2 | 670 |
| Comparative Example 3 | 661 |
| Comparative Example 4 | 594 |
| Comparative Example 5 | 673 |
| Comparative Example 6 | 669 |

Referring to Table 3, in the case of Examples 1 to 4 in which first roll-pressing, pre-lithiation, and second roll-pressing were carried out and the ratio ($p_1/p_2$) of porosity ($p_1$) of negative electrode active material layer after first roll-pressing to porosity ($p_2$) of negative electrode active material layer after second roll-pressing was adjusted to a desirable level, it can be seen that an excellent cycle capacity retention rate and excellent energy density as compared to Comparative Examples 1 to 6 were exhibited.

The invention claimed is:

1. A method of manufacturing a negative electrode, comprising:

applying a negative electrode slurry on a negative electrode current collector and subjecting the applied negative electrode slurry to a first roll-pressing to form a negative electrode active material layer;

pre-lithiating the negative electrode active material layer to form a pre-lithiated negative electrode active material layer; and subjecting the pre-lithiated negative electrode active material layer to a second roll-pressing, wherein the negative electrode active material layer comprises a silicon-based active material, wherein a ratio ($p_1/p_2$) of porosity ($p_1$) of negative electrode active material layer after the first roll-pressing to porosity ($p_2$) of negative electrode active material layer after the second roll-pressing is in a range of 1.10-1.51, wherein the porosity of the negative electrode active material layer after the first roll-pressing is in a range of 35.4% to 48.1%, and wherein the silicon-based active material comprises a compound represented by Chemical Formula 1:

[Chemical Formula 1]

$SiO_x$, wherein $0 \leq x < 2$.

2. The method of claim 1, wherein the porosity of the negative electrode active material layer after the second roll-pressing is in a range of 29% to 34%.

3. The method of claim 1, wherein the silicon-based active material is present in an amount of 50% to 85% by weight based on a weight of solid content of the negative electrode slurry.

4. The method of claim 1, wherein the silicon-based active material comprises silicon (Si).

5. The method of claim 1, wherein the silicon-based active material has an average particle diameter ($D_{50}$) of 1 μm to 10 μm.

6. The method of claim 1, wherein the pre-lithiating of the negative electrode active material layer is carried out by manufacturing a pre-lithiation cell comprising a negative electrode structure, a counter electrode facing the negative electrode structure, a separator interposed between the negative electrode structure and the counter electrode, and a pre-lithiation electrolyte and electrochemically charging the pre-lithiation cell, wherein the negative electrode structure comprises:

the negative electrode current collector; and the negative electrode active material layer formed on the negative electrode current collector.

7. The method of claim 6, wherein the counter electrode comprises a lithium source selected from among lithium metal and a lithium-transition metal composite oxide.

8. The method of claim 6, wherein the pre-lithiating of the negative electrode active material layer is carried out by electrochemically charging the pre-lithiation cell, and wherein a state-of-charge (SoC) of the negative electrode active material layer is in a range of 5% to 35%.

9. The method of claim 6, wherein the pre-lithiating of the negative electrode active material layer is carried out while applying pressure to the pre-lithiation cell.

10. The method of claim 9, wherein the applied pressure is in a range of 0.1 MPa to 2.5 MPa.

* * * * *